United States Patent [19]

Kato et al.

[11] Patent Number: 4,474,542
[45] Date of Patent: Oct. 2, 1984

[54] OPERATION CONTROL METHOD AND DEVICE FOR A VEHICLE AIR CONDITIONING COMPRESSOR

[75] Inventors: Kimio Kato; Hiroya Kono; Hisao Kobayashi, all of Aichi, Japan

[73] Assignee: Kabushiki Kaisha Toyoda Jidoshokki Seisakusho, Aichi, Japan

[21] Appl. No.: 296,936

[22] Filed: Aug. 28, 1981

[30] Foreign Application Priority Data

Aug. 30, 1980 [JP] Japan ................................ 55-121300

[51] Int. Cl.³ .............................................. F04B 1/00
[52] U.S. Cl. .................................... 417/270; 62/196.3; 62/228.5; 417/299
[58] Field of Search .............. 62/196 C, 196 R, 228.5, 62/510; 417/292, 299, 286, 287, 288, 428, 270; 236/1 EA

[56] References Cited

U.S. PATENT DOCUMENTS

| | | | |
|---|---|---|---|
| 1,786,791 | 12/1930 | Terry | 62/196 C |
| 2,245,053 | 6/1941 | Sanders, Jr. | 236/1 EA |
| 3,513,662 | 5/1970 | Golber | 236/1 EA |
| 3,545,220 | 12/1970 | Teegarden | 417/299 X |

*Primary Examiner*—William E. Wayner
*Attorney, Agent, or Firm*—Sughrue, Mion, Zinn, Macpeak & Seas

[57] ABSTRACT

An automobile air conditioner unit is provided with a compressor equipped with a number of compression chambers. At the start of air conditioner operation, less than all of these compression chambers are operated to avoid liquid compression. After start up, the number of compression chambers in operation will depend upon the air conditioning load, with a fewer number of chambers being operable at times when the load is low, as during temperature maintainance, as opposed to initial cool-down.

12 Claims, 7 Drawing Figures

OPERATION CONTROL METHOD AND DEVICE FOR A VEHICLE AIR CONDITIONING COMPRESSOR

BACKGROUND OF THE INVENTION

This invention relates to a method of controlling a compressor, especially a vehicle air conditioning compressor, and to a device for practicing the method.

In general, air conditioning operations for a vehicle interior are carried out in a temperature reducing mode, in which the temperature of the vehicle interior is decreased; and in a temperature maintenance mode, in which the temperature inside the vehicle is maintained at a comfortably low value. In the temperature reducing mode effected during initial operation, a high air conditioning capability is required, but in the temperature maintenance mode, such a high air conditioning capability is not required. Heretofore, in many cases, a compressor having a capacity as large as permitted by the capacity of the engine was installed on the vehicle in order to achieve the air conditioning operation quickly. Therefore, when the compressor was run steadily in the temperature maintenance mode, the capability of the compressor was excessively high with respect to the air conditioning load, and therefore the compressor was in a low load air conditioning operation. Accordingly, the compressor was operated with a low volumetric efficiency and the on-off frequency of the clutch interposed between the compressor and the engine was increased. Therefore, the clutch was liable to be quickly worn, and since a large start torque is produced whenever the on-off operation of the clutch is carried out, the operator feels uncomfortable while he drives the vehicle.

On the other hand, at the start of the compressor, liquid compression is sometimes cured. The liquid compression is a serious problem for a compressor in which the quantity of discharge per revolution at the start is large and a sufficiently large discharge chamber volume is not provided. The liquid compression greatly reduces the durability of the compressor, and sometimes produces loud noises. Some higher quality vehicles employ a system in which the compressor is operated with the EPR (evaporator pressure regulator) cycle providing a constant evaporation pressure, and when the refrigerant is overcooled it is blown off after being heated to the optimum temperature. However, this system is not economical in many aspects.

SUMMARY OF THE INVENTION

Accordingly, an object to this invention is to provide a method of controlling the operation of a vehicle air conditioning compressor and a device for practicing the method in which the aforementioned liquid compression problem sometimes caused at the start of the compressor has been eliminated.

Another object of the invention is to provide a method of controlling the operation of a vehicle air conditioning compressor and a device for practicing the method, in which the above-described difficulties accompanying a conventional compressor operated in the temperature maintenance mode have been eliminated.

BRIEF DESCRIPTION OF THE DRAWINGS

One embodiment of the invention will be described with reference to the accompanying drawings, in which.

DETAILED DESCRIPTION OF THE PRESENT INVENTION

Figure 1:
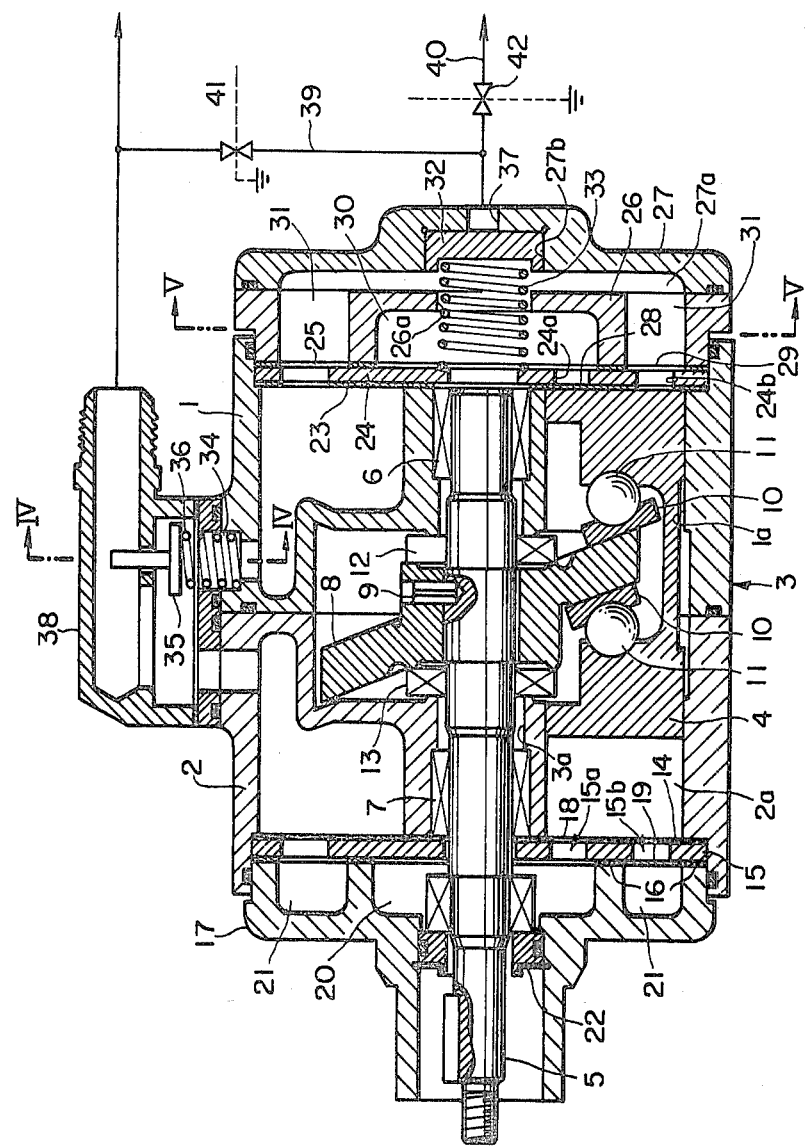
FIGS. 1 through 3 are sectional side views of a compressor according to the present invention.
Figure 2:
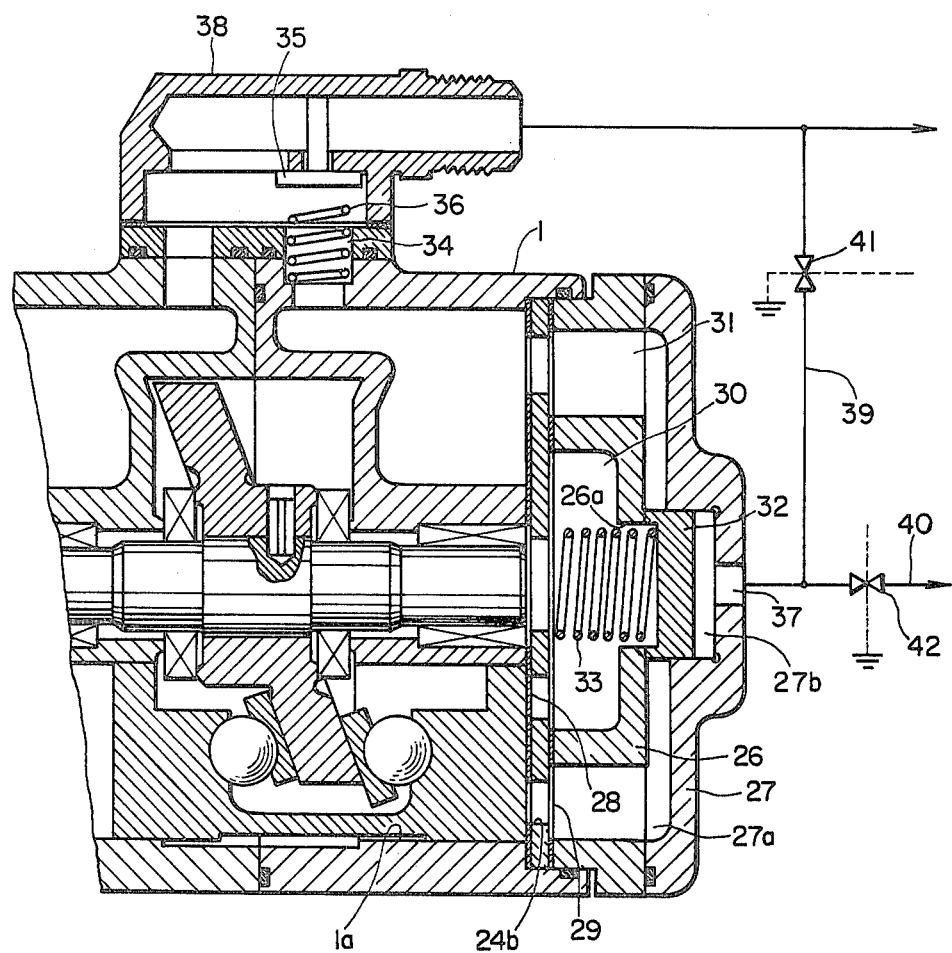
Figure 3:
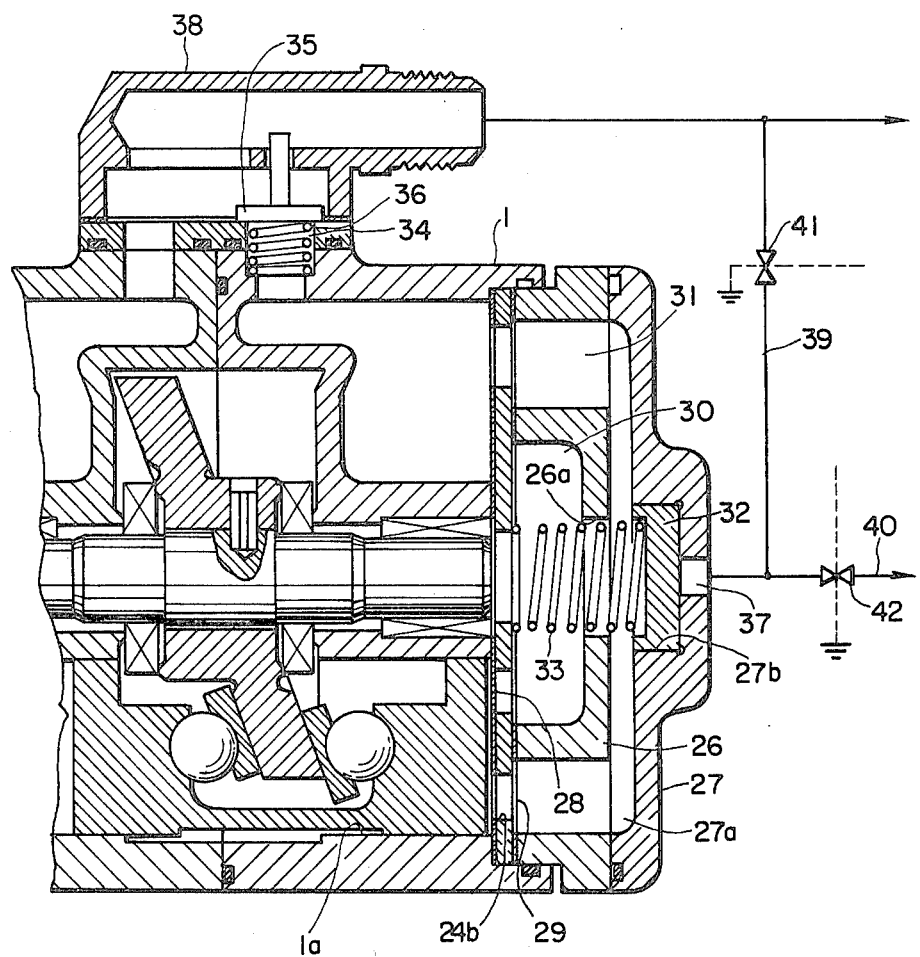
Figure 4:
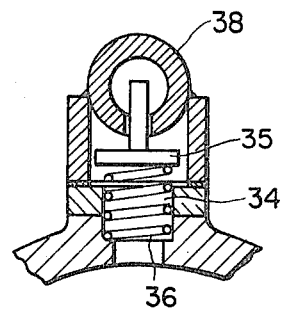
FIG. 4 is a sectional view taken along line IV—IV of FIG. 1.
Figure 5:
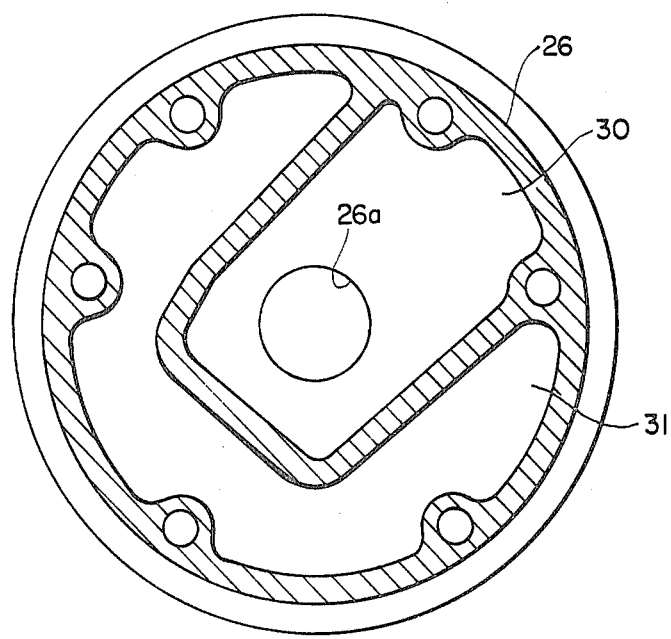
FIG. 5 is a sectional view taken along the line V—V of FIG. 1.

In FIGS. 1 through 3, reference numerals 1 and 2 designate symmetrical cylinder blocks which are combined together into a compressor body 3. The cylinder blocks 1 and 2 have three cylinder bores 1a and three cylinder bores 2a, respectively, which are compression chambers. A two-head type piston 4 is slidably fitted in these cylinder bores 1a and 2a. A rotary shaft 5 is inserted into the central hole 3a of the compressor body 3, and is rotatably supported by bearings 6 and 7. A slanting plate 8 is fixedly mounted on the middle portion of the rotary shaft 5 with a spring pin 9. As the slanting plate 8 is rotated, the piston 4 is reciprocated in the cylinder bores 1a and 2a by means of shoes 10 and balls 11. In FIG. 1, reference numerals 12 and 13 designate thrust bearings.

A front housing 17 is fixedly secured to the end face of the cylinder block 2 through a suction valve seat 14, a valve plate 15 and a gasket 16. In correspondence to the cylinder bores 2a, three suction openings 15a and discharging openings 15b are formed in the valve plate 15. These openings, the suction valve seat 14 and discharge valve reeds form three suction valves 18 and three discharge valves 19. Each suction valve 18 is provided at a position where it can suck refrigerant gas from a common suction chamber 20 formed in the front housing 17. Each discharge valve 19 is provided at a position where it can discharge refrigerant gas into a common discharge chamber 21.

The rotary shaft 5 is extended outside through the central portion of the front housing 7. The protruded end of the rotary shaft 5 is coupled through a clutch to a drive source. The rotary shaft 5 is held air-tight in the front housing 17 by shaft sealing means 22.

An intermediate housing 26 is secured to the end face of the cylinder block 1 through a suction valve seat 23, a valve plate 24 and a gasket 25. A rear housing 27 is secured to the end face of the intermediate housing 26. Three suction openings 24a and three discharging openings 24b are formed in the valve plates in correspondence to the three cylinder bores 1a. These openings, the discharge valve seat 23 and discharge valve reeds form three suction valves 28 and three discharge valves 29. Each suction valve 28 is provided at a position where it can suck refrigerant gas from a common suction chamber 30 formed in the intermediate chamber 26, and each discharge valve 29 is provided at a position where it can discharge refrigerant gas into a common discharge chamber 31. A space is provided between the rear housing 27 and the intermediate housing 26. The space is employed as a passage 27a communicating the suction chamber 30 with the discharge chamber 31. A through-hole 26a is cut in the substantially central portion of the intermediate housing 26. The position of the through-hole is not limited to the central portion; that is, it may be provided at any position if it is substantially aligned with a recess 27b. The recess 27b is formed coaxially with the through-hole 26a in the substantially central portion of the rear housing 27 (the position of the recess 27b not being limited to the central portion, similarly as in the case of the through-hole 26a). A first cooling valve 32 for opening and closing the through-hole 26a is slidably inserted in the recess 27b in such a manner that it may slide in and out thereof. A spring 33 is inserted in the through-hole 26a to urge the first closing valve 32 towards the rear housing 27 at all times. The base of the spring 33 abuts against the valve plate 24 (however, it may abut against the intermediate housing 26).

The cylinder block 1 has a discharge passage 34 in which is provided a second closing valve 35 for opening and closing the passage 34. The second closing valve 35 has a spring 36 which urges the valve 35 to be normally open. The free length of the spring 36 is so selected that the second closing valve 35 is slightly spaced away from the discharge passage 34. The rear housing 27 has an introduction hole 37 for supplying a discharge pressure to the rear surface of the first closing valve 32. The introduction hole 37 is connected through a high pressure pipe 39 to a discharge flange 38. The high pressure pipe 39 is connected to a low pressure pipe 40 communicating with a suction flange (not shown), provided on the low pressure side. Electromagnetic valves 41 and 42 are interposed in the high pressure pipe 39 and the low pressure pipe 40, respectively. A control device for controlling thee electromagnetic valves 41 and 42 will be described with reference to FIG. 6.

Figure 6:
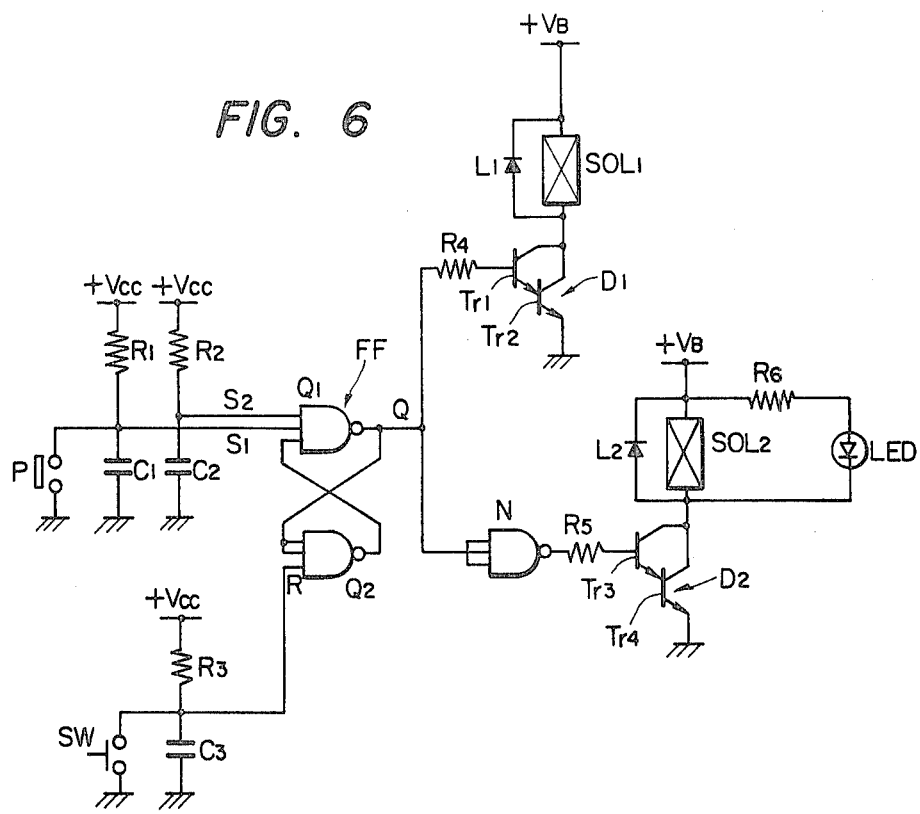
FIG. 6 is an electrical circuit diagram showing a control device employed in the invention.

As shown in FIG. 6, a flip-flop circuit FF consists of 3-input NAND gates Q1-Q2. A parallel circuit consisting of a pressure switch P grounded at one terminal, and a capacitor C1 is connected to one input terminal S1 of the NAND gate Q1. The pressure switch P is used for releasing quick refrigeration. A resistor R1 connected to a power source Vcc is connected to the input terminal S1. A capacitor C2 grounded at one terminal and a resistor R2 connected to the power source Vcc are connected to a input terminal S2 of the NAND gate Q1. The pressure switch P is provided at a suitable position in the suction passage, and it is so set that it is turned on when the pressure of returning refrigerant is decreased to a predetermined value (i.e. when the temperature of the inside of the vehicle or the temperature of the blow-off air is decreased to a predetermined value). A parallel circuit of a push button type switch SW grounded at one terminal and a capacitor C3 is connected to an input terminal R of the other NAND gate Q2. The push button type switch SW is used for quick or rapid air conditioning. A resistor R3 connected to the power source Vcc is connected to the input terminal R. The switch SW is provided on the inside of the vehicle for operator control.

The output terminal Q of the flip-flop circuit FF is connected through a resistor R4 to the base of a Darlington circuit D1 constituted by transistors Tr1 and Tr2. The output terminal Q is further connected through a NOT circuit N and a resistor R5 to the base of a Darlington circuit D2 constituted by transistors Tr3 and Tr4. A parallel circuit of the electromagnetic solenoid SOL1 of the electromagnetic valve 42 for the low pressure pipe 40 and a surge absorbing diode L1 is connected between the collector of the Darlington circuit D1 and another power source $V_B$. A parallel circuit of the electromagnetic solenid SOL2 of the electromagnetic valve 41 for the high pressure pipe 39 and a surge absorbing diode L2 is connected between the collector of the Darlington circuit D2 and the power source $V_B$. Furthermore, a series circuit of a resistor R6 and a light emitting diode LED is connected between the collector of the Darlington circuit D2 and the power source $V_B$. In the embodiment, the capacitance of the capacitor C1 is much larger than that of the capacitor C2 (C1>>C2).

Figure 7:
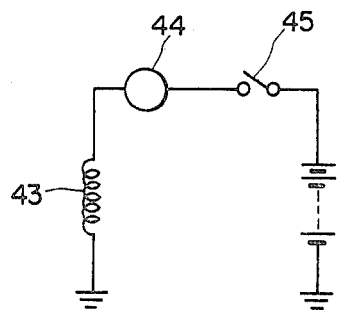
FIG. 7 is an electrical circuit diagram showing a control circuit for a clutch.

FIG. 7 shows an electrical circuit for controlling the operation of a clutch interposed between the compressor and the drive source. A clutch coil 43 is connected through a temperature switch 44 and a compressor switch 45 to a power source.

The operation of the compressor and control device thus arranged will now be described.

When the compressor is not in operation, the first and second closing valves 32 and 35 are opened by the elastic forces of the springs 33 and 36, respectively, and therefore the suction chamber 30 communicates with the discharge chamber 31 as shown in FIG. 1.

When, in this condition, the compressor switch 45 is turned on, the clutch coil 43 is excited to actuate the clutch, so that the piston 4 begins reciprocation through the slanting plate 8. However, it should be noted that, in the case where the compressor switch 45 is turned on as described above, the input to the flip-flop circuit FF is maintained at a logic level "0" (hereinafter referred to merely as "0", when applicable) for a period of time corresponding to the time constant of the resistor R1 and the capacitor C1, and therefore the output of the NAND gate Q1 of the flip-flop circuit FF is raised to a logic level "1" (hereinafter referred to merely as "1", when applicable). Therefore, the transistors Tr1 and Tr2 are rendered conductive (ON) and the electromagnetic solenoid SOL1 is excited. As a result, the electromagnetic valve 42 of the low pressure pipe 40 is opened, and therefore the suction chamber 30 is maintained in communication with the discharge chamber 31 in the rear side of the compressor. Thus, at the start of the operation, the front half of the compressor starts the operation, regularly, thus performing compression immediately; however, the rear half does not work substantially, i.e. it is in a rest state. The discharge passage 34 is opened, so that the discharge chamber on the front half communicates with the suction chamber 30 on the rear half. Thus, all the spaces in the compressor communicate with one another. That is, immediately after starting, both the front half and the rear half are in an idling operation, i.e. the operation of the compressor is at a compression capability of 0%. However, the amount of discharge flow towards the rear side through the clearance between the second closing valve 35 and the discharge passage 34 is large, and therefore the second closing valve 35 is brought in close contact with the discharge passage 34 by the discharge pressure of the front half. Accordingly, shortly after the clutch has been activated, the front half is brought into regular operation, and the operation of the compressor is at a compression capability of 50% (cf. FIG. 3). Thus, at the start of operation of the compressor, even if liquid is retained in the compressor, the compression is effected only in the front half thereof, and the liquid is allowed to flow to the rear discharge chamber. Therefore the liquid compression which is otherwise caused can be eliminated.

The structure of the second closing valve 35 is not limited only to that shown; that is, a check valve may be employed as the second closing valve 35. In this case, immediately when the compressor starts, the operation is effected with a compression capability of 50%; however, as the rear side of the compressor is in a rest state as described before, the degree of liquid compression is reduced by half. Furthermore, in this instance, the spring 36 may be eliminated.

After the start, the switch SW for rapid air conditioning is depressed when required. Then, a reset signal is applied to the terminal R of the NAND gate Q2 in the flip-flop circuit FF, and the output of the NAND gate Q1 is set to "0". As a result, the transistors Tr1 and Tr2 are rendered nonconductive (OFF) to deenergize the electromagnetic solenoid SOL1. At the same time, the transistors Tr3 and Tr4 are rendered conductive, to excite the electromagnetic solenoid SOL2. Accordingly, the electromagnetic valve 42 of the low pressure pipe 40 is closed, while the electromagnetic valve 41 of the high pressure pipe 39 is opened, so that the discharge pressure acts on the rear surface of the first closing valve 32 to cause the latter 32 to abut against the intermediate housing 26 against the elastic force of the spring 33, to interrupt the communication between the suction chamber 30 and the discharge chamber 31. Thus, regular compression action is also effected in the rear half of the compressor, so that the operation is carried out with a compression capability of 100% to achieve rapid cooling.

When the air in the vehicle is cooled until the room temperature reaches a predetermined value, i.e. when the suction pressure is decreased to a predetermined value, the pressure switch P is turned on. As a result, a set signal is applied to the input terminal S1 of the NAND gate Q1 in the flip-flop circuit FF, and the output of the NAND gate Q1 is raised to "1". Therefore, similar to the case of the start operation, the electromagnetic solenoid SOL1 is energized, while the electromagnetic solenoid SOL2 is deenergized, so that the electromagnetic valve 42 of the low pressure pipe 40 is opened, while the electromagnetic valve 41 of the high pressure pipe 39 is closed. As a result, the suction pressure is applied to the first closing valve 32, whereby the suction chamber 30 is communicated with the discharge chamber 31 through the first closing valve 32, thereby to stop the compression operation in the rear half of the compressor. As the pressure in the discharge chamber 31 decreases, the second closing valve 35 is lowered to the top of the spring 36 and is brought into close contact with the discharge passage 34 by the discharge pressure of the front half of the compressor. Thus, the compressor is operated with a compression capability of 50% when the pressure switch P is turned on, and thereafter steady operation is effected. In the steady operation with the air conditioning low load, as long as the room temperature is maintained below the predetermined value, i.e. until the pressure switch P is turned off by an increase of the vehicle room temperature due to insufficient circulation of the refrigerant, for instance, the operation is maintained at a compression capability of 50% even if the push button type switch SW is operated. However, it goes without saying that, if the switch SW is operated after the pressure switch P has been turned off, the operation is switched over the 100% compression operation. Therefore, during the steady operation of the compressor in the temperature maintenance mode, with respect to the on-off operation of the clutch controlled by the temperature switch 44 for air conditioning, the starting torque is small and the shock is less because the compressor is operated at a compression capability of 50%. Furthermore, as the compressor operates at a small compression percentage during air conditioning at low load, the operation is excellent in volumetric efficiency, and the on-off frequency of the clutch is decreased, which results in an increase of the service life of the clutch.

The compression capability of the compressor described above is switched in two steps: 50% and 100%; however, this invention is not limited thereto or thereby. That is, the compressor may be so designed that the compession capability can be suitably selected according to the variations of air conditioning loads by increasing the number of switching steps and the available degrees of compression. It is desirable that means such as a timer be employed so that even when the power switch and the rapid air conditioning push button type switch SW are operated simultaneously, the operation of the system of the push button type switch SW is slightly delayed.

In the above-described embodiment, electromagnetic valves 41 and 42 are provided in the high pressure pipe 39 and the low pressure pipe 40, respectively. The arrangement may be so modified that one three way electromagnetic valve is provided at the connecting point of the two pipes 39 and 40, and the pressure applied to the first closing valve 32 is varied by operating the valve. In this modification, the number of valves can be decreased, and the number of components in the valve control system can also be decreased.

In the described embodiment, an electrical means is employed to control the operation of the first closing valve 32 thereby to switch the compression degree of the compressor. This electrical means may be replaced by mechanical means. For instance, a cable may be employed as the mechanical means. One method employable for this purpose is as follows: The first closing valve 32 is urged to open by a spring, and one end portion of the cable is connected to the closing valve 32, while the other end portion of the cable is extended into the vehicle interior so that the first closing valve is closed by pulling the cable. In this method, locking means are used to then hold the cable to maintain the first closing valve closed. The locking means can be released by a switch which responds to a predetermined temperature in the vehicle. In another method, unlike the above-described method in which the first closing valve 32 is directly operated, the valves of the high pressure pipe 39 and the low pressure pipe 40 are operated. The operations of the valves can be achieved similarly to the case of the first method.

As is apparent from the above description, the vehicle air conditioning compressor of the invention is operated by using a part of the full compression capability at the start, and thereafter it is operated with a larger compression capability as required. Therefore, the liquid compression which otherwise occurs at the start can be prevented, with the result that the durability of the compressor can be increased. Furthermore, according to the invention, when the room temperature is decreased to a predetermined value, i.e., when the compressor is operated at a low air conditioning load, the compressor is operated with the compression capability decreased. Accordingly, during this steady-state operation, the compressor is operated in a range which is excellent in volumetric efficiency, the start-up torque can be decreased, and the on-off frequency of the clutch can be reduced resulting in an increase of the service life of the clutch. The compression capability switching operation is carried out automatically, and therfore, the difficulties which are caused when the operator forgets to turn off the switch can be eliminated.

We claim:

1. A vehicle air conditioning compressor, comprising:
   at least two compression chambers;
   a first normally open closing valve disposed between a section chamber and a discharge chamber of a first one of said compression chambers and providing communication between said discharge and suction chambers, respectively;
   a second normally open closing valve between said at least two compression chambers and providing communication therebetween;
   means for biasing said first and second valves open; and
   switching means for closing said first valve when a rapid air conditioning operation is desired, said switching means operating a compressor during a start-up operation creating a pressure differential between said at least two compression chambers which closes said second valve.

2. A device as claimed in claim 1, wherein said switching means comprises first and second solenoid means and pressure valves controlled by said solenoids, said pressure valves being disposed in high and low pressure conduits, respectively, whereby high and low pressure may be applied to said first closing valve for operating the same.

3. A device as claimed in claim 1, comprising first switch means associated with said switching means, said switch means being manually operated, and operable to effect said rapid air conditioning operation.

4. A device as claimed in claim 1, wherein said switching means comprises a flip-flop circuit, a first Darlington circuit connected to the output of said flip-flop for energizing a first solenoid, a second Darlington circuit connected to the output of said flip-flop, via a NOT circuit, for energizing a second solenoid.

5. A device as claimed in claim 4, wherein an output of said first switch means is applied to an input terminal of said flip-flop.

6. A device as claimed in claim 5, wherein said flip-flop receives as a further input, the output of pressure switch means operable in response to a suction pressure prevailing within said compressor.

7. A device as claimed in claim 6, wherein said first and second solenoids operate pressure valves controlling operation of said closing valves, said switching means operating to decrease the number of operable compression chambers in response to a signal from said pressure switch means, and increase the number of said operable chambers in response to a signal from said first switch means.

8. The compressor as claimed in claim 1, wherein said switching means opens said first valve when a rapid air conditioning operation is not required.

9. The compressor as claimed in claim 1 wherein said closing of said first valve reduces said pressure differential between said at least two compression chambers which opens said second valve.

10. The compressor as claimed in claim 1, further comprising means maintaining said first valve open a predetermined period of time after said vehicle air conditioning compressors is actuated.

11. A method of controlling the operation of a vehicle air conditioning compressor having a plurality of compression chambers, comprising the steps of:
    activating said compressor;
    maintaining a first normally open closing valve disposed in a first passage interconnecting a suction chamber and a discharge chamber in a first compression chamber in an open state when said compressor is activated to generate a pressure differential between said first and a second compression chamber interconnected by a discharge chamber having a second normally open closing valve disposed therein in order to close said second normally open closing valve; and
    thereafter, when a rapid air conditioning operation is required, closing said first normally open closing valve to reduce said pressure differential and open said second normally open closing valve.

12. The method as claimed in claim 11 further comprising the step of opening said first normally open closing valve when a rapid air conditioning operation is not required to again generate said pressure differential to again close said second normally open closing valve.

* * * * *